(12) United States Patent
Nafe et al.

(10) Patent No.: US 12,209,650 B2
(45) Date of Patent: Jan. 28, 2025

(54) LIQUID-TIGHT DRIVE CONNECTION FOR ENGINE AND TRANSMISSION COUPLING

(71) Applicant: Caterpillar Inc., Peoria, IL (US)

(72) Inventors: Michael Nafe, Holzwickede (DE); Dennis Grimm, Nordkirchen (DE); Thomas Hoelken, Bergkamen, DE (US)

(73) Assignee: Caterpillar Inc., Peoria, IL (US)

( * ) Notice: Subject to any disclaimer, the term of this patent is extended or adjusted under 35 U.S.C. 154(b) by 12 days.

(21) Appl. No.: 17/764,433

(22) PCT Filed: Sep. 21, 2020

(86) PCT No.: PCT/EP2020/025425
§ 371 (c)(1),
(2) Date: Mar. 28, 2022

(87) PCT Pub. No.: WO2021/058128
PCT Pub. Date: Apr. 1, 2021

(65) Prior Publication Data
US 2022/0364638 A1    Nov. 17, 2022

(30) Foreign Application Priority Data
Sep. 27, 2019   (EP) .................................. 19200279

(51) Int. Cl.
*F16H 57/02*        (2012.01)
*E21C 31/12*       (2006.01)
(Continued)

(52) U.S. Cl.
CPC ........... *F16H 57/02* (2013.01); *F16H 57/027* (2013.01); *F16H 57/029* (2013.01); *E21C 31/12* (2013.01);
(Continued)

(58) Field of Classification Search
CPC ...... F16H 57/02; F16H 57/025; F16H 57/027; F16H 57/029; F16H 57/031;
(Continued)

(56) References Cited

U.S. PATENT DOCUMENTS

| 1,704,890 A | * | 3/1929 | Gerson | ..................... F16H 3/24 |
|---|---|---|---|---|
| | | | | 74/606 R |
| 2,270,980 A | | 1/1942 | Tidball | |

(Continued)

FOREIGN PATENT DOCUMENTS

| CN | 102221055 A | 10/2011 |
|---|---|---|
| CN | 203163968 U | 8/2013 |

(Continued)

OTHER PUBLICATIONS

Machine translation of CN 102221055 A obtained on Apr. 28, 2023.*

(Continued)

*Primary Examiner* — Adam D Rogers (57) ABSTRACT

The present invention pertains to a drive connection for coupling an engine to a gearbox of a machine and which provides a fluid-tight sealing. Accordingly, a drive connection for coupling an engine to a gearbox of a machine is suggested, which comprises a housing having an inner cavity that extends from a first open end of the housing to a second open end of the housing and which is configured for accommodating and enclosing a clutch. The housing defines a first coupling interface at the first open end for coupling the drive connection to an engine and a second coupling interface at the second open end for coupling the drive connection to a gearbox, Furthermore, each coupling interface comprises a sealing member, wherein the housing and sealing members are configured to fluidically seal the inner cavity, when the drive connection is in a coupled state.

20 Claims, 4 Drawing Sheets

(51) Int. Cl.
*F16H 57/027* (2012.01)
*F16H 57/029* (2012.01)
*F16H 57/04* (2010.01)
*F16H 57/025* (2012.01)
*F16H 57/031* (2012.01)

(52) U.S. Cl.
CPC .......... *F16H 57/025* (2013.01); *F16H 57/031* (2013.01); *F16H 57/0408* (2013.01)

(58) Field of Classification Search
CPC ....... F16H 57/0408; F16H 2057/02039; F16H 2057/02069; E21C 31/12
See application file for complete search history.

(56) References Cited

U.S. PATENT DOCUMENTS

| | | | | |
|---|---|---|---|---|
| 2,952,165 | A | | 9/1960 | Bade |
| 3,187,209 | A | * | 6/1965 | Louise .................. F16H 57/031 74/411 |
| 3,625,310 | A | * | 12/1971 | Herrick ................. F16N 19/003 184/6.12 |
| 3,663,062 | A | | 5/1972 | Young et al. |
| 3,855,871 | A | * | 12/1974 | Gibson ................... B65G 23/44 74/661 |
| 3,889,780 | A | | 6/1975 | Dison |
| 4,836,322 | A | * | 6/1989 | Sakakiyama ...... B60K 23/0808 180/197 |
| 5,667,042 | A | | 9/1997 | Olsen et al. |
| 6,718,847 | B2 | * | 4/2004 | Rimkus ............... F16H 57/0447 184/6.12 |
| 7,827,878 | B2 | * | 11/2010 | Langer .................. F16H 57/025 74/423 |
| 7,926,819 | B2 | | 4/2011 | Reinhart et al. |
| 8,876,219 | B2 | | 11/2014 | Hausladen et al. |
| 9,032,840 | B2 | * | 5/2015 | Prior ................... F16H 57/0461 475/159 |
| 10,288,175 | B2 | * | 5/2019 | Schmitt ................ F16J 15/3256 |
| 10,690,230 | B2 | * | 6/2020 | Teillet .................... F16D 43/20 |
| 2015/0256049 | A1 | * | 9/2015 | Gacka ................... H02K 11/33 310/68 D |
| 2018/0087420 | A1 | * | 3/2018 | Poster ................ F16H 57/0449 |

FOREIGN PATENT DOCUMENTS

| | | | | |
|---|---|---|---|---|
| CN | 203537157 | U | | 4/2014 |
| CN | 103174415 | B | | 3/2015 |
| CN | 105927729 | B | | 1/2019 |
| CN | 208764301 | U | * | 4/2019 |
| DE | 102005007248 | B3 | | 11/2006 |
| DE | 102006055772 | A1 | * | 10/2007 ........... B23K 26/206 |
| DE | 102015112252 | A1 | * | 2/2017 ............... B60S 9/08 |
| DE | 102019201112 | A1 | * | 7/2020 |
| EP | 0115794 | A1 | * | 8/1984 |
| FR | 2885663 | A1 | * | 11/2006 ............... F16H 1/16 |
| GB | 2471655 | A | * | 1/2011 ........... F16H 57/023 |
| JP | 2008025784 | A | * | 2/2008 ......... F16H 57/0408 |
| KR | 20150075110 | A | | 7/2015 |
| WO | WO-03019041 | A1 | * | 3/2003 ............... F16H 1/32 |
| WO | WO-2015197158 | A1 | * | 12/2015 ............ F16H 57/02 |
| WO | 2016160098 | A1 | | 10/2016 |

OTHER PUBLICATIONS

Machine translation of WO 2015/197158 A1 obtained on Jun. 1, 2023.*
Machine translation of JP 2008-25784 A obtained on Jun. 1, 2023.*
Machine translation of CN 208764301 U obtained on Jun. 6, 2023.*
Machine translation of FR 2885663 A1 obtained on Apr. 12, 2024.*
International Search Report related to Application No. PCT/EP2020/025425; reported on Feb. 1, 2021.
European Search Report related to Application No. 19200279; reported on Jan. 17, 2020.

* cited by examiner

LIQUID-TIGHT DRIVE CONNECTION FOR ENGINE AND TRANSMISSION COUPLING

CROSS-REFERENCE TO RELATED APPLICATION

This Application is a 35 USC § 371 US National Stage filing of International Application No. PCT/EP2020/025425 filed on Sep. 21, 2020 which claims priority under the Paris Convention to European Patent Application No. 19200279.8 filed on Sep. 27, 2019.

TECHNICAL FIELD

The present invention pertains to drive connections for coupling an engine to a gearbox of a machine, in particular for mining applications or mining machines, as well as to a system comprising a gearbox housing for a machine and a corresponding drive connection coupled to a corresponding coupling interface of the gearbox housing.

TECHNOLOGICAL BACKGROUND

Drive connections are commonly used to couple a gearbox or transmission to a motor, and generally house or accommodate a clutch to enable a required torque coupling. The drive connection thereby forms a connecting interface and often forms a support for the motor, such that, in the assembled state, the motor is held and supported only on one end by the drive connection and the coupled gearbox. Since the motor or engine and the gearbox are frequently not produced by the same manufacturer, difficulties may occur when fixing the motor to the drive connection, such that a primary focus of the drive connection lies in the provision of an adequate and preferably variable fixation or attachment means so as to adapt to a variety of configurations of different manufacturers.

Furthermore, due to the different configurations and partial incompatibility of connecting interfaces, present drive connections are not fluid tight. Although this may generally not be of primary concern, situations may arise, which require such drive connections to be sealed against e.g. water or oil. For example, situations may occur, wherein the drive and hence the drive connection are partially operated in water, such that it must be prevented that water can enter the drive connection so as to avoid water from penetrating into the motor via e.g. the bearing. In addition, a clutch may be used, which is required to be fully run or operated in oil. In such case, oil leaks from the drive connection need to be prevented.

Both of these situations may particularly occur in underground mining applications, wherein machinery is operated in moist or even (partial) underwater conditions and/or wherein the machinery requires a clutch that is oil-run. In this regard, longwall mining systems generally comprise a gearbox or transmission system that is equipped with a respiratory filter for venting and pressure compensation in the event of temperature changes, e.g. between the ambient air and the transmission temperature, and/or for equalizing pressure during operation.

Under certain circumstances, however, the gearbox system may come in contact with the external water, dirt, and/or dust that flow through the holes in the gearbox housing. As a result, damage may occur to the gearbox system. Moreover, the dirt from the environment may cause the respiratory filter to become blocked or clogged, such that pressure and temperature control is impaired in function. This may result in high-pressure buildup in the gearbox system and drive connection, such that operation needs to be discontinued in order to avoid further damage of the machine driving components.

Therefore, a need exists to prevent liquids from leaking into and out of the core components of the drive assembly and to ensure that such drive assembly is also operable under harsh underground conditions.

SUMMARY OF THE INVENTION

Starting from the prior art, it is an objective to provide a new and inventive drive connection for coupling an engine or motor to a gearbox of a machine. In particular, it may be an objective to provide a drive connection that allows operation in (partial) underwater conditions and/or which allows that a clutch may be fully run in oil.

This objective is solved by means of a drive connection with the features of claim 1. Preferred embodiments are set forth in the present specification, the Figures as well as the dependent claims.

Accordingly, a drive connection for coupling an engine to a gearbox of a machine is suggested, which comprises a housing having an inner cavity that extends from a first open end of the housing to a second open end of the housing and configured for accommodating and enclosing a clutch. The housing defines a first coupling interface at the first open end for coupling the drive connection to an engine or motor and a second coupling interface at the second open end for coupling the drive connection to a gearbox. Each coupling interface furthermore comprises a sealing member, wherein the housing and sealing members are configured to fluidically seal the inner cavity, when the drive connection is in a coupled state.

Furthermore, a system is suggested, which comprises a gearbox housing for a machine and a drive connection as described herein, wherein the drive connection is coupled to a corresponding coupling interface of the gearbox housing and wherein the gearbox housing defines an inner cavity for receiving a gear or transmission and is formed as a continuous enclosure that fluidically seals the inner cavity. The gearbox housing furthermore comprises a pressure sensor in communication with the inner cavity and configured to detect a pressure within the inner cavity and to be communicatively coupled with a control unit of the machine.

BRIEF DESCRIPTION OF THE DRAWINGS

The present disclosure will be more readily appreciated by reference to the following detailed description when being considered in connection with the accompanying drawings in which.

DETAILED DESCRIPTION OF PREFERRED EMBODIMENTS

In the following, the invention will be explained in more detail with reference to the accompanying figures. In the Figures, like elements are denoted by identical reference numerals and repeated description thereof may be omitted in order to avoid redundancies.

Figure 1:
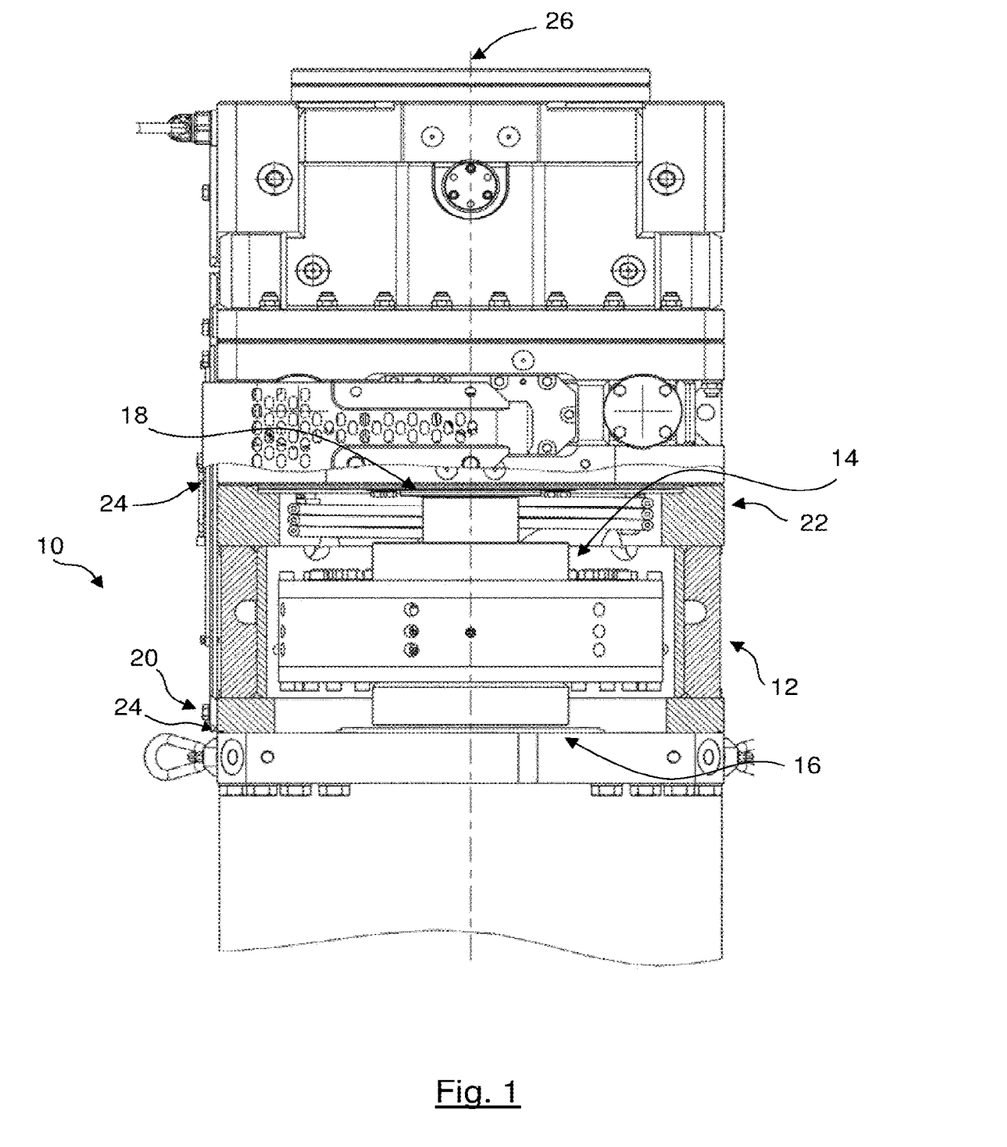
FIG. 1 depicts a schematic view of a partial longitudinal section of a drive connection coupled to a motor and a gearbox.

In FIG. 1, a drive connection 10 is schematically shown in an arrangement with a coupled motor and a gearbox, which are schematically depicted on the bottom and top side of FIG. 1, respectively. The drive connection may hence be implemented in a machine and be configured to couple the engine to a gearbox of such machine. For example, the drive connection may contain a clutch, as may be required for certain applications, e.g., in mining applications, such as longwall mining systems.

The drive connection 10 comprises a housing 12, which defines an inner cavity 14 that extends from a first open end 16 of the housing 12 to a second open end 18 of the housing 12, thereby forming a continuous space that is communicatively coupled with an exterior of the drive connection 10. The inner cavity 14 may hence be configured to accommodate and enclose a clutch and/or clutch components, as required, which are not shown with all details in the present embodiment. The housing 12 therefore forms a protective cover for each of the components accommodated therein.

Furthermore, the first and second open end 16, 18 of the housing 12 may allow a shaft to extend through the inner cavity 14, so as to provide a torque transmission from a motor to a gear. Although the first and second end 16, 18 may have various arrangements, i.e. be at an angle with respect to each other, according to the present embodiment, these are arranged at opposing ends along a longitudinal axis 26. At each open end 16, 18, the housing 12 furthermore defines a respective first and second coupling interface, 20, 22 for coupling the drive connection 10 to an engine and a gearbox, respectively. Although not shown in further detail, such coupling may e.g. be provided by one or more fixation screws or bolts, which securely fix the respective coupling interface 20, 22 to a corresponding coupling interface of a component to be coupled therewith, e.g. by coupling interfaces essentially formed as flanges with one or more bores or through holes.

In order to ensure that the inner cavity 14 of the housing 12 is protected from liquids or fluids penetrating from the surroundings of the drive connection 10 into the inner cavity 14, each coupling interface 20, 22 furthermore comprises a sealing member 24, wherein the housing 12 and sealing members 24 are configured to fluidically seal the inner cavity 14, when the drive connection 10 is in a coupled state. For example, the sealing members 24 may be formed as gaskets, grommets, or O-rings, which surround the opening 16, 18 of the respective coupling interface 20, 22, and which are deformed upon coupling due to compressive forces acting thereupon. Thereby, the sealing members 24 are brought flush with both, the coupling interfaces 20, 22 of the drive connection 10 and the component to be coupled and form a continuous fluid-tight sealing. The sealing members 24 may be accommodated in a corresponding groove or recess provided at the respective coupling interface 20, 22, wherein a geometry of the sealing member 24 and the coupling interfaces 20, 22 is preferably adapted to the coupling interface of the component to be coupled, in order to further optimize and facilitate the fluidic sealing.

As outlined above, the fluid-tight sealing prevents liquids around the drive connection 10 from entering the inner cavity 14, such that a potential damage to the machinery may be avoided. At the same time, this also ensures that liquids contained in the drive connection 10, i.e. in the inner cavity 14, may not escape or leak out from the inner cavity 14. Thereby, the drive connection 10 may also be configured to be filled with lubricants, such as oil, such that a clutch and/or clutch components, optionally comprised within the inner cavity 14 of the drive connection 10 may be run in oil, which may be required for certain applications, in particular in mining applications.

Figure 2:
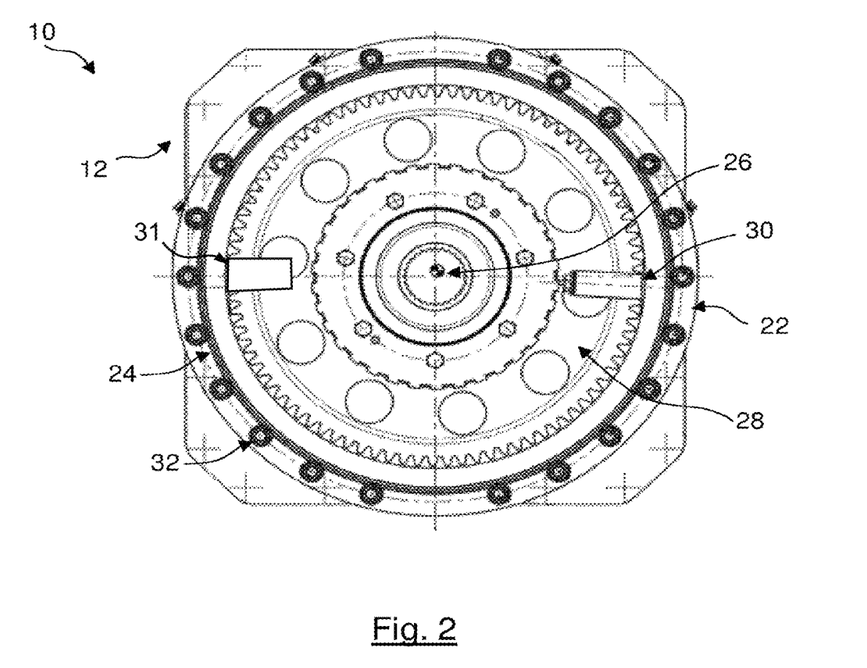
FIG. 2 is a schematic side view of the drive connection according to FIG. 1 in an uncoupled state seen from a gearbox side.

FIG. 2 shows the drive connection 10 according to FIG. 1, in an uncoupled state in a schematic depiction and seen from a gearbox side. Accordingly, the second coupling interface 22 can be seen in a view from the longitudinal axis 26. Here, the sealing member 24 is shown to fully enclose and surround the second opening and the components accommodated within the inner cavity. In this embodiment, an optional crown gear 28 is shown to be accommodated within the inner cavity, wherein an optional speed sensor 30 is arranged within the inner cavity and is optically coupled with the crown gear or corresponding component of the shaft 26 so as to communicate a detected speed to a control unit of the machine (not shown), e.g. via a communication interface.

Furthermore, the embodiment according to FIG. 2 comprises optional alignment pins 32, which are arranged along an outer circumference of the second opening and the corresponding coupling interface 22. It will be obvious that the embodiment is not limited to the number of alignment pins depicted here and that the spacing between the alignment pins 32 may also be different, such that the alignment pins 32 may also be provided in various alternative arrangements. However, in this embodiment, the alignment pins 32 are essentially arranged at equidistant spacing along the circumference and at essentially the same radial distance with regard to the longitudinal axis 26. The alignment pins 32 facilitate the coupling of the drive connection 10 to the gearbox—and similarly to the motor on the other coupling interface (not shown) of the drive connection 10 and ensured that the drive connection 10 is properly aligned and oriented with regard to the gearbox (and motor). Furthermore, this ensures that the sealing member 24 is arranged between the coupling interface 22 and the gearbox in a predefined manner, thereby further ensuring a proper sealing of the inner cavity of the drive connection 10.

Figure 3:
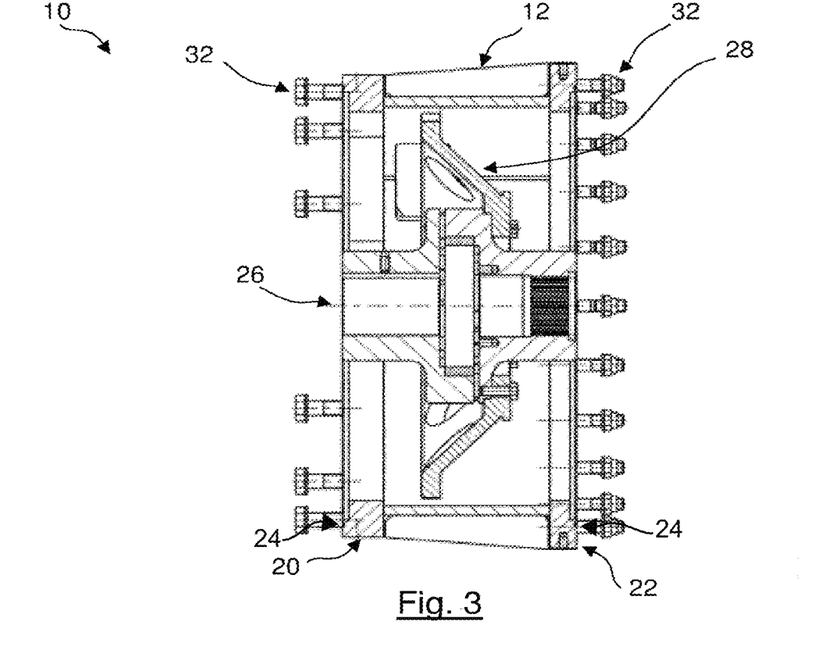
FIG. 3 is a schematic longitudinal section view of the drive connection according to FIG. 2.

FIG. 3 shows a schematic longitudinal section view of the drive connection 10 of FIG. 2, wherein the alignment pins 32 are shown both on the second coupling interface 22 and the first coupling interface 20 of the drive connection 10. Accordingly, the alignment pins 32 on the first coupling interface 20 may also facilitate the coupling, alignment, orientation, and sealing of the inner cavity at the first open end or first coupling interface 20 at a motor side of the drive connection 10, as described in the above in view of the second's coupling interface 22.

Here, it is also shown that the sealing members 24 may at least in part be accommodated in the respective coupling interface 20, 22, for example, within a groove or recess of the coupling interface 20, 22. Although the sealing member 24 may be glued to the coupling interface 20, 22, it may also be provided that the groove or recess essentially retains the sealing member 24, but allows a detachment, e.g. for replacement purposes or to adapt the drive connection to other geometries or operating requirements.

Figure 4:
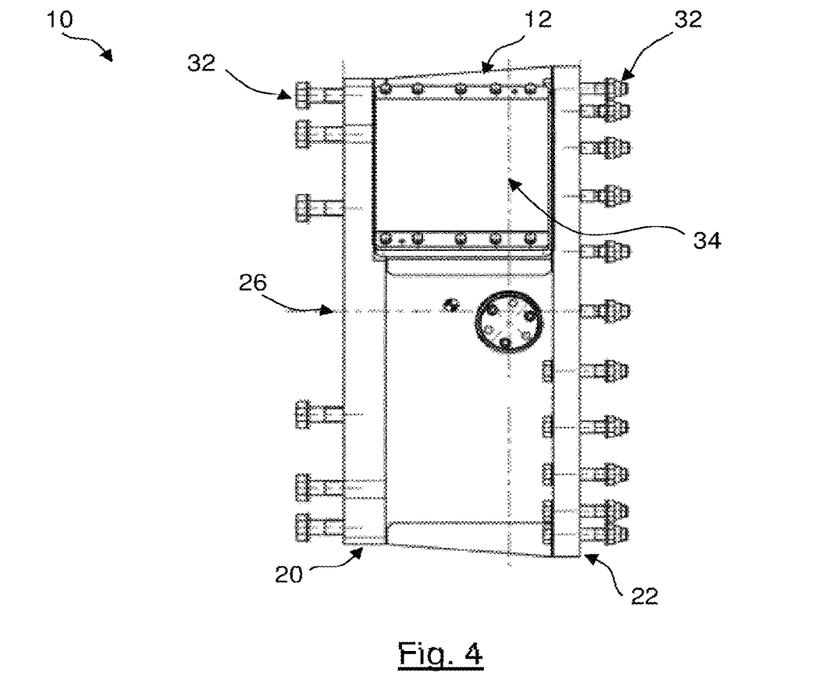
FIG. 4 is a schematic side view of the drive connection according to FIG. 3.

The housing 12 of the drive connection 10 may furthermore comprise of one or more closures 34, as shown in the embodiment of FIG. 4. The closure 34 may e.g. provide that a low-speed gear may be coupled or other optional components to the machinery via the inner cavity of the drive connection 10. The closure 34 may be configured to be opened and closed via a pivot or hinge and is configured to seal an opening to the inner cavity in a closed position, e.g. by means of a corresponding sealing member surrounding said opening. However, such pivot or hinge is merely optional and the closure 34 may also be releasably attached to the housing 12 via one or more fixation means, or screws at opposing ends of the closure 34, as shown in FIG. 4. Furthermore, although the closure 34 is shown to extend between the first and second coupling interface 20, 22, the closure 34 may also have alternative configurations and e.g. be dimensioned smaller.

Figure 5:
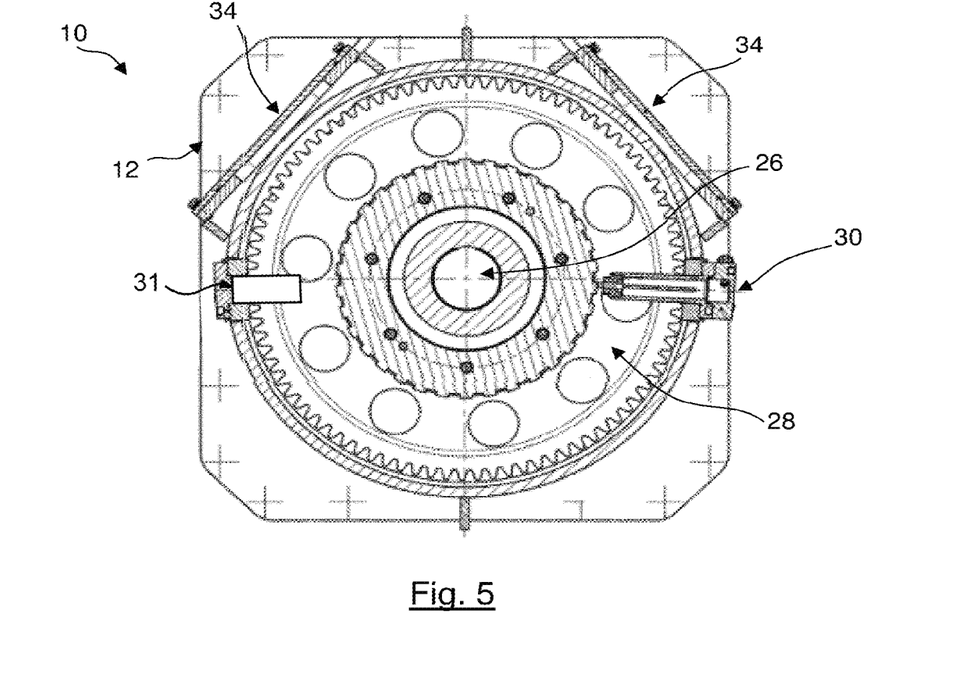
FIG. 5 is a schematic cross-sectional view of the drive connection according to FIG. 4.

The closure 34 is shown in more detail in the embodiment according to FIG. 5, which shows a schematic cross-sectional view of the drive connection 10. In this embodiment, the optional crown gear 28 and speed sensor 30 are also shown, wherein the speed sensor 30 is shown to extend through the housing 12 in a fluid-tight matter and which facilitates a communicative coupling with e.g. a control unit. In this embodiment, two closures 34 are shown in a mirrored fashion with regard to a longitudinal plane passing through the longitudinal axis 26, i.e. wherein the closures 34 are spaced apart from each other in a circumferential direction. Thereby, alternative configurations and further components may be coupled to the machinery via the inner cavity of the housing 12, thereby facilitating adjustments to the drive connection and or to a clutch or clutch components accommodated within the inner cavity.

In addition, on the opposite side of the speed sensor 30, another connecting interface is shown to enable an entrance into the inner cavity 14 and which may accommodate e.g. another sensor 31, for example, one or more sensors configured to detect a temperature, a fluid level, and/or pressure within the inner cavity and which is also communicatively coupled with a control unit of the machine.

Figure 6:
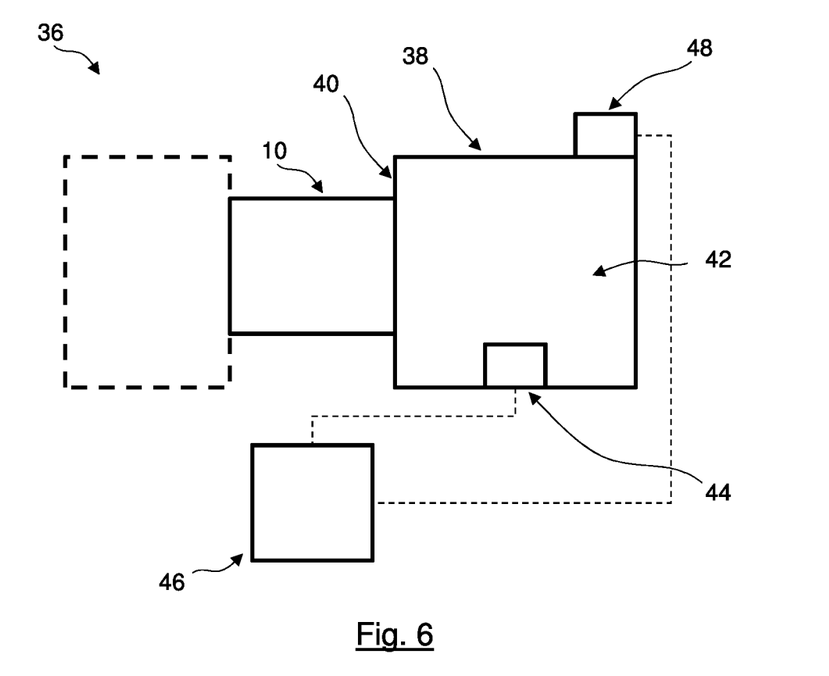
FIG. 6 is a schematic view of a system comprising a gearbox housing and a drive connection.

In FIG. 6, a schematic view of a system 36 is shown, which comprises a gearbox housing 38 and a drive connection 10 as described above. The drive connection 10 is coupled to a corresponding coupling interface 40 of the gearbox housing 38, e.g. via fixation means, such as fixation screws or bolts and/or flanges. On the other end of the drive connection 10, a motor may be coupled, as indicated by the dashed rectangular shape. The gearbox housing 38 defines an inner cavity 42 for receiving a gear or transmission and is formed as a continuous enclosure which fluidically seals the inner cavity 42. Thereby, the gearbox housing and system are fully compatible with working environments that may put the corresponding parts of the system 36 at least partially in underwater conditions and furthermore allow that the inner cavity 42 may be filled with a lubricant such as oil, such that the machinery components may be run in oil, as may be required in certain applications. Accordingly, such configuration prevents liquids around the housing 38 to enter into the inner cavity 42 while at the same time this ensures that liquids contained within the inner cavity 42 may not leak out into the surroundings. These conditions may particularly apply in mining applications, such that the system 36 may be implemented in a mining application, device, or machine.

In order to avoid that a pressure within the inner cavity 42 exceeds a lower and/or upper threshold range, the gearbox housing 38 furthermore comprises a pressure sensor 44 that is in communication with the inner cavity 42 and is configured to detect a pressure within the inner cavity 42 and is communicatively coupled with a control unit 46 of the machine, which is shown here as an optional feature of the system 36. Accordingly, a user or operator may not only monitor a current pressure or a pressure course, but also may be notified, when a current pressure exceeds a predefined tolerance limit, e.g. via an outputted alarm.

Furthermore, the gearbox housing 38 also comprises an optional valve 48, which is configured to be actuated based on a detected pressure in the inner cavity 42 of the gearbox housing 38. Although the valve 48 may be configured as a pressure relief valve so as to reduce and avoid excess pressure within the inner cavity 42, according to the present embodiment, the valve 48 is configured as an electrically actuatable control valve, which is communicatively coupled with the control unit 46 of the machine and is configured to be actuated based on a pressure in the inner cavity 42 of the gearbox housing 38 detected by the pressure sensor 44.

The valve 48 hence ensures that an overpressure that would be potentially detrimental for the components accommodated within the gearbox housing 38 is avoided and that the pressure within the gearbox housing may be drained or controlled. The actuatable control valve also ensures that an inner pressure may be adjusted, even when such tolerance range is not exceeded, so as to optimize the operating conditions, either manually or automatically by means of the control unit, and that the valve may be operable during operation and in an off-state of an engine of the machine. For example, the actuatable valve may be actuated by an electronic circuitry, which may be e.g. battery operated, even when the machine is essentially not operating, e.g. when a coupled combustion motor or engine is turned off. Thereby, post-operative cooling, when configured as a bi-directional valve, and/or pressure equalization may be provided, such that wear and potential damage of the inner component of the gearbox may be prevented.

It will be obvious for a person skilled in the art that these embodiments and items only depict examples of a plurality of possibilities. Hence, the embodiments shown here should not be understood to form a limitation of these features and configurations. Any possible combination and configuration of the described features can be chosen according to the scope of the invention.

This is in particular the case with respect to the following optional features which may be combined with some or all embodiments, items and/or features mentioned before in any technically feasible combination.

A drive connection for coupling an engine to a gearbox of a machine may be provided.

The drive connection comprises a housing having an inner cavity that extends from a first open end of the housing to a second open end of the housing and is configured for accommodating and enclosing a clutch. The housing defines a first coupling interface at the first open end for coupling the drive connection to an engine or motor and a second coupling interface at the second open end for coupling the drive connection to a gearbox. Each coupling interface furthermore comprises a sealing member, wherein the housing and sealing members are configured to fluidically seal the inner cavity, when the drive connection is in a coupled state.

The drive connection may hence form an interface between a motor and a gearbox, wherein the inner space forms a through hole that may be essentially limited by an outer wall and comprises two open ends for receiving corresponding coupling elements of the motor and the gearbox, respectively. The housing may hence accommodate a clutch to provide a torque coupling between the motor and the gearbox, such that the drive connection may also be formed as a clutch housing.

Furthermore, the housing of the drive connection may form a support for the motor, such that, in a coupled state, the motor is only supported on one end, wherein the drive connection forms a bearing. Accordingly, the drive connection and in particular the housing thereof may provide sufficient structural stability such that the motor may assembled with one end of the motor being free.

The coupling interfaces may be respectively adapted to a motor coupling interface and a gearbox coupling interface so as to provide a securely fixed attachment upon assembly. For example, each coupling interface may comprise one or more bores for receiving bolts or fixation screws, such that the drive connection may be connected and secured to the motor and the gearbox, preferably in a releasable manner.

The sealing members may furthermore be accommodated or received by the coupling interfaces. For example, the sealing members may be formed as an elastic gasket or flat seal, which is arranged in a corresponding groove of the respective coupling interface and which fully surrounds the respective opening. Each coupling interface may also comprise one or more recesses to accommodate a sealing member that has been pre-shaped or molded and/or may comprise a groove that is adapted to receive e.g. an O-ring as a sealing member. In such case, the sealing members may be adapted both to the dimensions of the coupling interface of the drive connection and the coupling interface of the motor and/or gearbox.

The use of such sealing members furthermore has the advantage that the dimensions may be varied depending on the operation conditions and requirements and may furthermore be easily replaced upon overhaul or when wear or brittleness is detected. Alternatively, the coupling interface may have fully integrated sealing members or may even be comprised of a sealing member, e.g. by providing, at least in part, an integrated resilient material.

Thereby, when the drive connection is properly assembled, each sealing member is compressed by a corresponding coupling interface of the motor and gearbox, such that a fluidic sealing is provided towards the opening. Since the housing and inner cavity only comprise two openings that are hence sealed upon assembly, no fluids and in particular no liquids may leak into the inner cavity of the housing, such that the components contained therein are protected. Thereby, water and/or dirt from the surroundings may not penetrate the machinery, such as the clutch and motor, such that damage may be prevented.

By the same token, no fluids and liquids may leak out of the inner cavity, such that oil may be fully retained in the drive connection and hence a clutch may be installed that is oil-run.

Preferably, the drive connection is configured for coupling an engine and gearbox of a mining machine. As outlined in the above, such mining machine is generally used in underground conditions, e.g. in longwall system applications, wherein a moist and dusty environment is generally present. Furthermore, the drive connection, and indeed also the motor and/or gearbox, may be operated at least partially in underwater conditions, depending e.g. on the geographic location and the mining method that is used. The configuration of the drive connection and the sealing members hence ensures that the machinery is protected from any detrimental external influences and may hence be operated under a variety of conditions. Due to the particular requirements of such mining machinery, such fluidic sealing was previously not possible.

The coupling interfaces may be arranged at opposing ends of the housing in an axial direction, such that the drive connection is arranged between the engine or motor and the gearbox, when the drive connection is in the coupled state. Although generally the ends of the housing may be arranged at an angle with respect to each other, this arrangement provides a direct shaft extension and torque transmission while at the same time ensuring that forces act on the sealing members and coupling interfaces in the same manner. Furthermore, it may be envisaged that e.g. the coupling interfaces of the gearbox and the motor are also coupled to each other by means of e.g. an extension, such that in this case, the drive connection may be clamped in between the motor and the gearbox, thereby further facilitating the sealing.

To further facilitate the fluidic sealing of the drive connection, the coupling interfaces may comprise a geometry matching a geometry of the coupling interface of the engine or motor and/or the coupling interface of the gearbox.

For example, the coupling interfaces may be shaped, e.g. by one or more keys, protrusions, and/or recesses, such that the coupling interface is at least in part accommodated or received by the corresponding coupling interface of the motor or gearbox. Such geometry may furthermore bias the respective sealing member into a predefined position, thereby ensuring that a proper sealing may be provided upon coupling of the drive connection. Accordingly, the geometry may not only ensure that the drive connection and motor are correctly positioned relative to each other, but may also ensure that a sealing occurs in a predefined manner.

To further assist the proper coupling and alignment of the drive connection with respect to the motor and/or gearbox, each coupling interface may comprise a plurality of alignment pins that are configured to be received by corresponding recesses of the coupling interface of the engine and/or the coupling interface of the gearbox.

The matching geometry and the provision of alignment pins, e.g. bolts, has the advantage that the drive connection and the motor and gearbox may be fully adapted to each other so as to provide an optimal fluidic sealing without requiring welding. Thereby, coupling and assembly effort are significantly reduced while at the same time a sufficient structural stability is provided, which is reproducible and furthermore allows an easy replacement by decoupling the respective components, e.g. by loosening of fixation screws.

The housing of the drive connection may furthermore comprise at least one closure movable between a closed position sealing the inner cavity and an open position for receiving a chain tensioner or low-speed gear. Alternatively, or in addition, the housing may comprise at least one speed sensor in communication with the inner cavity and which may be communicatively coupled with a control unit of the machine.

The closure may e.g. be formed as a flap, which is pivotable between an open and closed position, wherein a sealing member may surround an opening to the inner cavity such that the flap compresses the entire sealing member towards an outer wall of the housing of the drive connection in the closed position so as to fluidically seal the inner cavity. Thereby, a chain tensioner or low-speed gear may be coupled to the machinery, e.g. to a shaft or gearwheel, which may be formed so as to compress the sealing member of the closure in a fluid-tight manner.

By the same token, a speed sensor may be integrated in the inner cavity, e.g. via an outer wall of the housing, in a fluid-tight manner. Such speed sensor may e.g. be in communication with a toothed wheel or gearwheel. A communication interface may furthermore ensure that the detected speed or signal is communicated to the control unit of the machine, e.g. via a corresponding wiring and/or circuitry.

Preferably, the drive connection comprising two closures that are arranged at the circumference of the housing in a mirrored arrangement along the axial direction. In other words, the closures may be provided in a symmetrical manner, e.g. at opposing sides in a radial direction. Thereby, further components may be integrated in the drive connection while at the same time a larger construction and configuration flexibility is provided by allowing components to be coupled at different sides of the drive connection, e.g. depending on the orientation and machine requirements.

For an even distribution and for the sealing member to be flush with the coupling interface, the sealing member is preferably formed as a sealing ring of a non-metallic material, preferably a resilient polymer material or elastomer. Thereby, a compressive force, e.g. due to fixation of fixation screws, may bias the sealing member both towards the coupling interface of the drive connection and the coupling interface of the motor and gearbox, respectively, such that a uniform sealing is provided along the respective open end. For example, the sealing member may be formed of a silicone-based or rubber material configured for the compressive strengths required for providing a secured fixation and proper fluidic sealing.

Since the sealing of the inner cavity not only ensures that liquids may not penetrate the inner cavity, but also that liquids may not leak out of the inner cavity, the housing may furthermore comprise one or more plugs for receiving a liquid lubricant in and/or draining a liquid lubricant from the inner cavity of the housing, wherein the one or more plugs are arranged at a region corresponding to a maximum fluid level and/or at a region corresponding to a minimum fluid level in the inner cavity, when the drive connection is in the coupled state.

For example, one or more plugs may be arranged on a top and bottom side of the housing of the drive connection seen in a gravitational field and when the drive connection is in its purported coupled state. Thereby, a lubricant may be easily filled into the inner cavity and be drained without spillage and it may simultaneously be ensured that the entire inner cavity is filled with the lubricant. For example, the inner cavity may be filled with oil, such that a clutch contained in the inner cavity may be run in oil, as may be required by the corresponding machine configuration.

Furthermore, the drive connection may comprise one or more sensors in communication with the inner cavity and configured to detect a temperature, a fluid level, and/or pressure within the inner cavity and to be communicatively coupled with a control unit of the machine. Accordingly, the conditions within the drive connection may be determined and provided as a feedback to the control unit of the machine, such that a monitoring of the machine may be provided and any critical conditions may be detected. For example, although oil may not leak out of the inner surface, oil may be transferred to the coupled gearbox or motor, which may reduce the fluid level and may require additional oil to be introduced via e.g. a corresponding top plug in the housing. By the same token, due to operation, the temperature and pressure within the inner cavity may fluctuate and may require a manual intervention of a user or operator. By providing such sensors and monitoring, an air outlet valve may be omitted, such that an improved air tightness may be achieved while at the same time the operating conditions may be monitored and be maintained within tolerance ranges.

The fluidic sealing, in particular with regard to liquids, e.g. water and oil, hence has the advantage that the drive connection may be operated under various conditions, in particular underground mining conditions, without impairing or damaging the inner machinery. At the same time, the provision of one or more sensors may ensure that a monitoring of the operating conditions is provided, such that, due to the closed system, no potentially detrimental operating conditions are established and said conditions may be maintained with a predefined tolerance range.

Accordingly, a system is furthermore suggested, which comprises a gearbox housing for a machine and a drive connection as described in the above, wherein the drive connection is coupled to a corresponding coupling interface of the gearbox housing and wherein the gearbox housing defines an inner cavity for receiving a gear or transmission and is formed as a continuous enclosure that fluidically seals the inner cavity. The gearbox housing furthermore comprises a pressure sensor in communication with the inner cavity and configured to detect a pressure within the inner cavity and to be communicatively coupled with a control unit of the machine.

The gearbox housing hence provides that a transmission system or gear may be fully enclosed in a fluid-tight manner so as to protect the components accommodated within the housing and/or any coupled devices against water and/or oil, for example. Accordingly, the penetration of liquids, dust, and/or dirt that may be present in the surroundings is avoided. Thereby, the system may be operated in various external conditions and may be adapted for underground mining applications, such as longwall mining systems. Furthermore, in this regard, the continuous enclosure provides that use of a respiratory filter is omitted, such that a clogging of said filter due to the external factors is avoided. The continuous enclosure and the lack of any respiratory filters hence ensures that the operation of the system is not impaired by external factors and may be performed in and essentially predefined manner while at the same time damage to the components of the machinery may be avoided. Also, this provides that the gearbox may be filled with a lubricant such as oil, which may be required for a gear accommodated in the inner cavity of the gearbox housing, and ensures that such lubricant is maintained within the inner cavity and does not leak into the surroundings.

The pressure sensor, which may be accommodated within the housing, furthermore ensures that pressure deviations are detected and may be provided as a feedback for a control unit of the machine. Such feedback may e.g. be displayed on a corresponding monitor or display screen of the machine, such that a user or operator is provided with an overview of the current operating status and condition of the machine.

Preferably, the system comprises a control unit configured to monitor the pressure in the inner cavity of the gearbox and to output an alarm, when a detected pressure exceeds a predetermined threshold, preferably via a coupled user interface.

For example, one or more predefined thresholds may be stored within or provided to the control unit, such that the detected internal pressure may be compared with said thresholds, wherein an exceeding of said thresholds may indicate e.g. an impermissible high-pressure buildup in the system, such that a user may be required to intervene, e.g. by adjusting the operating condition of the machine and/or temporarily pausing particular processes.

Furthermore, the gearbox housing may comprise at least one valve configured to be actuated based on a detected pressure in the inner cavity of the gearbox housing.

Preferably, the valve is configured as a pressure relief valve or as an electrically actuatable control valve that is configured to be communicatively coupled with a control unit of the machine and to be actuated based on a pressure in the inner cavity of the gearbox housing detected by the pressure sensor. For example, the valve may be configured as a solenoid and/or bi-directional valve.

Such valve may hence ensure that an overpressure that would be potentially detrimental for the components accommodated in the housing is avoided. In other words, the pressure within the gearbox housing may be drained controlled. While the pressure relief valve may be adapted to equalize or reduce a pressure within the inner cavity of the gearbox housing to a value within a predefined tolerance range, an electrically actuatable control valve also ensures that an inner pressure may be adjusted, even when such tolerance range is not exceeded, so as to optimize the operating conditions, either manually or automatically by means of the control unit.

This also allows that the valve may be actuated to increase a pressure within the inner cavity, e.g. when configured as a bidirectional valve, in the case of an under pressure, which may result from operation of the system and gearbox. By providing the valve as an actuatable valve, it may furthermore be provided that the valve is not actuated in a situation, wherein the gearbox is e.g. at least partially under water so as to avoid any liquids or fluids from penetrating the inner cavity and potentially causing damage to the machinery. In addition, the actuatable valve also ensures that an airflow may be temporarily and/or periodically provided into the inner cavity for cooling purposes. Preferably, these functions are controlled automatically by the control unit by means of an integrated control logic, but may also be manually controlled, such that an operator may manually intervene, e.g. in case of a malfunctioning or an emergency.

The valve may furthermore be configured to be operable during operation and in an off-state of an engine of the machine.

For example, the pressure relief valve may still be actuated by means of the inner pressure within the inner cavity, even after the machine has been turned off. By the same token, and actuatable valve may be actuated by the electronic circuitry, which may be e.g. battery operated, even when the machine is essentially not operating, e.g. when a coupled combustion motor or engine is turned off. Thereby, post-operative cooling and pressure equalization may be provided, such that wear and potential damage of the inner component of the gearbox may be prevented.

During operation, the one or more valves may also be configured to avoid e.g. under pressure or overpressure conditions within the gearbox housing. As outlined in the above, this may be dependent on the current position of the machine or system components, for example, based on a current water level and/or an activity or process of the machine, e.g. a current mining step during a continuous process. In order to provide an improved level of flexibility as to the operating conditions, the one or more valves may also be fluidly connected to one or more closable conduits or snorkels, such that actuation of actuatable valves may also be provided in underwater operating conditions and under pressure within the inner cavity of the gearbox housing.

From the above, it will furthermore be obvious that the gearbox housing of the system may also be used and sold without the coupled drive connection and independent of the system, i.e. as a separate component, which may be coupled to a motor either directly or via an optional drive connection, depending on the machine configuration and the respective requirements.

INDUSTRIAL APPLICABILITY

With reference to the Figures, a drive connection for coupling an engine to a gearbox of a machine and a system equipped with such drive connection are suggested. The suggested drive connection as mentioned above is applicable in any mining appliance, such as a longwall mining system or roof support shield, wherein the machine requires a drive connection and particularly a clutch to be present between a motor and a gearbox. The fluid sealing and configuration of the coupling interfaces provides that the drive connection may be adapted to a coupling interface of a motor and a gearbox and preferably provides a simple and releasable fixation means, such that component of the machinery may be easily replaced and do not require soldering or welding for either structural stability or a fluid-tight sealing. The drive connection, motor, and gearbox may furthermore be produced from the same manufacturer, such that the drive connection may be fully adapted for coupling a motor and gearbox. Further, the drive connection may replace conventional welded and/or not fluid-tight drive connections as a replacement or retrofit part, which may be exchanged e.g. upon overhaul.

The invention claimed is:

1. A drive connection for coupling an engine to a gearbox of a machine, comprising:
a housing having an inner cavity extending from a first open end of the housing to a second open end of the housing and configured for accommodating and enclosing a clutch,
one or more sensors in communication with the inner cavity and configured to detect a pressure within the inner cavity, the one or more sensors configured to be communicatively coupled with a control unit of the machine,
wherein the housing defines a first coupling interface at the first open end for coupling the drive connection to the engine and a second coupling interface at the second open end for coupling the drive connection to the gearbox,
wherein each coupling interface comprises a sealing member and wherein the housing and sealing members are configured to fluidly seal the inner cavity when the drive connection is in a coupled state, each sealing member positioned radially outward of an entirety of the inner cavity so as to fully surround and fluidly seal the inner cavity, the one or more sensors extending radially inward of each sealing member.

2. The drive connection according to claim 1, wherein the coupling interfaces are arranged at opposing ends of the housing in an axial direction, such that the drive connection is arranged between the engine and the gearbox, when the drive connection is in the coupled state.

3. The drive connection according to claim 1, wherein the coupling interfaces comprise a geometry matching a geometry of the coupling interface of the engine and/or the coupling interface of the gearbox.

4. The drive connection according to claim 3, wherein each coupling interface comprises a plurality of alignment pins configured to be received by corresponding recesses of the coupling interface of the engine or the coupling interface of the gearbox.

5. A drive connection according to claim 1, wherein the housing comprises at least one closure movable between a closed position sealing the inner cavity and an open position for receiving a chain tensioner or gear.

6. The drive connection according to claim 5, wherein the at least one closure comprises two closures that are arranged at the circumference of the housing in a mirrored arrangement along an axial direction.

7. The drive connection according to claim 1, wherein each sealing member is formed as a sealing ring of a non-metallic material.

8. The drive connection according to claim 1, wherein the housing is configured for receiving a liquid lubricant in and/or draining a liquid lubricant from the inner cavity of the housing from a region corresponding to a maximum fluid level and/or from a region corresponding to a minimum fluid level in the inner cavity, when the drive connection is in the coupled state.

9. The drive connection according to claim 1, wherein the one or more sensors are configured to detect a temperature within the inner cavity and to be communicatively coupled with the control unit of the machine.

10. A system, comprising a gearbox housing for a machine and a drive connection according to claim 1 coupled to a corresponding coupling interface of the gearbox housing,
wherein the gearbox housing defines an inner cavity for receiving a gear or transmission and is formed as a continuous enclosure fluidly sealing said inner cavity of the gearbox housing, wherein the gearbox housing comprises a gearbox pressure sensor in communication with the inner cavity and configured to detect a pressure within the inner cavity and to be communicatively coupled with the control unit of the machine.

11. The system according to claim 10, wherein the drive connection includes an external closure that extends radially outward of each sealing member.

12. The system according to claim 10, wherein the control unit is configured to monitor the pressure in the inner cavity of the gearbox housing and to output an alarm, when a detected pressure exceeds a predetermined threshold.

13. The system according to claim 12, wherein the control unit is configured to output the alarm via a coupled user interface.

14. The system according to claim 10, wherein the gearbox housing comprises at least one valve configured to be actuated based on a detected pressure in the inner cavity of the gearbox housing.

15. The system according to claim 14, wherein the valve is configured as a pressure relief valve or as an electrically actuatable control valve configured to be communicatively coupled with the control unit of the machine and to be actuated based on the detected pressure in the inner cavity of the gearbox housing detected by the pressure sensor.

16. The system according to claim 15, wherein the valve is configured as at least one of a solenoid valve and a bidirectional valve.

17. The system according to claim 14, wherein the valve is configured to be operable during operation and in an off-state of an engine of the machine.

18. The drive connection according to claim 1, wherein the housing comprises at least one speed sensor in communication with the inner cavity and configured to be communicatively coupled to the control unit of the machine.

19. The drive connection according to claim 1, further comprising one or more sensors in communication with the inner cavity and configured to detect a fluid level within the inner cavity and configured to be communicatively coupled with the control unit of the machine.

20. A drive connection for coupling an engine to a gearbox of a machine, comprising:
a housing having an inner cavity extending from a first open end of the housing to a second open end of the housing and configured for accommodating and enclosing a clutch,
one or more sensors in communication with the inner cavity, the one or more sensors configured to be communicatively coupled with a control unit of the machine, and
a plurality of alignment pins protruding from the housing,
wherein the housing defines a first coupling interface at the first open end for coupling the drive connection to the engine and a second coupling interface at the second open end for coupling the drive connection to the gearbox,
wherein each coupling interface comprises a first sealing member that fully surrounds the first open end and a second sealing member that fully surrounds the second open end, the first sealing member and the second sealing member being positioned radially inward of the alignment pins, and wherein the housing and the first and second sealing members are configured to fluidly seal the inner cavity when the drive connection is in a coupled state.

* * * * *